United States Patent
Inagaki et al.

(10) Patent No.: US 9,543,615 B2
(45) Date of Patent: Jan. 10, 2017

(54) NONAQUEOUS ELECTROLYTE BATTERY AND BATTERY PACK

(71) Applicant: KABUSHIKI KAISHA TOSHIBA, Tokyo (JP)

(72) Inventors: Hiroki Inagaki, Yokohama (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/778,836

(22) Filed: Feb. 27, 2013

(65) Prior Publication Data
US 2013/0224565 A1    Aug. 29, 2013

(30) Foreign Application Priority Data

Feb. 27, 2012  (JP) .................. 2012-040475
Feb. 8, 2013   (JP) .................. 2013-023458

(51) Int. Cl.
*H01M 10/0566* (2010.01)
*H01M 10/056* (2010.01)
(Continued)

(52) U.S. Cl.
CPC ........... *H01M 10/056* (2013.01); *H01M 4/485* (2013.01); *H01M 10/0525* (2013.01); *Y02E 60/122* (2013.01); *Y02T 10/7011* (2013.01)

(58) Field of Classification Search
None
See application file for complete search history.

(56) References Cited

U.S. PATENT DOCUMENTS 6,221,534 B1 *  4/2001  Takeuchi et al. ............. 429/347
6,676,713 B1 *  1/2004  Okada ..................... H01M 4/04
                                                         29/623.1
(Continued)

FOREIGN PATENT DOCUMENTS

CN    1941459 A    4/2007
CN  101297418 A   10/2008
(Continued)

OTHER PUBLICATIONS

Chinese Office Action issued May 6, 2015 in Patent Application No. 201310061483.1 (with English Translation).
(Continued)

*Primary Examiner* — Cynthia K Walls
(74) *Attorney, Agent, or Firm* — Oblon, McClelland, Maier & Neustadt, L.L.P.

(57) ABSTRACT

According to one embodiment, a nonaqueous electrolyte battery includes a positive electrode, a negative electrode and a nonaqueous electrolyte. The negative electrode contains an active material having a lithium absorption potential of not lower than 0.4 V vs. Li/Li$^+$. The nonaqueous electrolyte contains a fluorine-containing lithium salt and a phosphorous compound. The phosphorous compound is at least one selected from the group consisting of $A_xH_{3-x}PO_4$ (wherein A is at least one element selected from Na and K, and x is from 0 to 3) and $A'_yH_{(6-2y)}(PO_4)_2$ (wherein A' is at least one element selected from Mg and Ca, and y is from 0 to 3).

16 Claims, 4 Drawing Sheets

(51) Int. Cl.
H01M 10/0525 (2010.01)
H01M 4/485 (2010.01)

(56) References Cited

U.S. PATENT DOCUMENTS

| | | | |
|---|---|---|---|
| 2007/0072080 A1* | 3/2007 | Inagaki et al. | 429/231.1 |
| 2007/0243468 A1* | 10/2007 | Ryu | H01M 2/1686 |
| | | | 429/231.95 |
| 2008/0166637 A1 | 7/2008 | Inagaki et al. | |

FOREIGN PATENT DOCUMENTS

| | | |
|---|---|---|
| JP | 9-199179 | 7/1997 |
| JP | 3866740 | 10/2006 |
| JP | 2009-81048 A | 4/2009 |
| JP | 2009-231124 A | 10/2009 |
| JP | 2013-152825 A | 8/2013 |

OTHER PUBLICATIONS

Combined Office Action and Search Report issued Oct. 29, 2014 in Chinese Patent Application No. 201310061483.1 (with English translation).

Office Action issued Jul. 19, 2016 in Japanese Patent Application No. 2013-023458 (with unedited computer generated English language translation).

* cited by examiner

NONAQUEOUS ELECTROLYTE BATTERY AND BATTERY PACK

CROSS-REFERENCE TO RELATED APPLICATIONS

This application is based upon and claims the benefit of priority from Japanese Patent Applications No. 2012-040475, filed Feb. 27, 2012, and No. 2013-023458, filed Feb. 8, 2013, the entire contents of all of which are incorporated herein by reference.

FIELD

Embodiments relate to a nonaqueous electrolyte battery and a battery pack.

BACKGROUND

Nonaqueous electrolyte batteries which are charged/discharged based on the movement of lithium ions between a negative electrode and a positive electrode are being investigated and developed as batteries having a high energy density. Nonaqueous electrolyte batteries including a lithium transition metal composite oxide and a carbonaceous material as active materials have already been commercialized. In the lithium transition metal composite oxide, Co, Mn, Ni, or the like is used as a transition metal.

Recently, nonaqueous electrolyte batteries including, for example, a lithium titanium composite oxide (about 1.5 V vs. Li/Li$^+$) having a lithium absorption-release potential higher than that of the carbonaceous material as an active material have been investigated (see Jpn. Pat. No. 3866740 and JP-A 9-199179 (KOKAI)). Since the lithium titanium composite oxide changes little in volume with charge and discharge, it is excellent in cycle characteristics. Such nonaqueous electrolyte batteries are theoretically free from lithium metal deposition and can be charged at a high current.

However, the amount of water adsorbed on the surface of the lithium titanium composite oxide is large, and a hydroxyl group is present on the surface. Thus, water mainly reacts with the nonaqueous electrolyte to produce a free acid. The produced free acid dissolves an active material of a positive electrode. The dissolved substance is precipitated on the surface of a negative electrode, resulting in an increase in surface resistance. Consequently, the battery capacity, particularly the life performance accompanied by the resistance increase is reduced.

DETAILED DESCRIPTION

Hereinafter, nonaqueous electrolyte batteries according to embodiments will be explained in detail.

The nonaqueous electrolyte battery according to the embodiment includes a case; a positive electrode; a negative electrode; and a nonaqueous electrolyte. The positive electrode contains an active material and is housed in the case. The negative electrode is housed in the case, is spacially apart from the positive electrode, and contains an active material having a lithium absorption potential of not lower than 0.4 V vs. Li/Li$^+$. The nonaqueous electrolyte is provided in the case. The nonaqueous electrolyte contains a fluorine-containing lithium salt and a phosphorous compound. The phosphorous compound is at least one compound selected from the group consisting of $A_xH_{3-x}PO_4$ (wherein A is at least one element selected from Na and K, and x is 0 or more and 3 or less) and $A'_yH_{(6-2y)}(PO_4)_2$ (wherein A' is at least one element selected from Mg and Ca, and y is 0 or more and 3 or less).

In the nonaqueous electrolyte battery according to another embodiment, the phosphorous compound is contained in the negative electrode in place of the nonaqueous electrolyte.

Inevitable water originated from constituting members or generated in the production step is contained in the nonaqueous electrolyte battery. Water reacts with a fluorine-containing lithium salt contained in the nonaqueous electrolyte such as LiBF$_4$ or LiPF$_6$ to produce fluoric acid (free acid). Fluoric acid reacts with the active material of the positive electrode to dissolve a constituent element of the active material, for example, a transition metal element. The dissolved transition metal ions are moved and precipitated on the negative electrode surface, resulting in an increase in the resistance. The battery life is caused by two factors such as capacity and resistance. The life reduction resulting from the resistance means that performance for maintaining a predetermined power in high-output batteries is reduced.

As a technique for removing such water contained, there is a known method in which activated alumina or the like is added to physically adsorb the water. However, the method has drawbacks that the water-removing effect is low and the water once adsorbed is released again with increasing temperature.

The present inventors have found that when an electrolyte contains at least one phosphorous compound selected from the group consisting of $A_xH_{3-x}PO_4$ (wherein A is at least one element selected from Na and K, and x is 0 or more and 3 or less) and $A'_yH_{(6-2y)}(PO_4)_2$ (wherein A' is at least one element selected from Mg and Ca, and y is 0 or more and 3 or less), the life performance resulting from resistance can be improved. Such an effect can be realized by allowing the phosphorous compound to be contained in the negative electrode.

The improvement in the life performance resulting from resistance by allowing the phosphorous compound to be contained in the nonaqueous electrolyte or the negative electrode is considered due to the following mechanism. That is, the phosphorous compound contained in the non-aqueous electrolyte mainly reacts with the fluoric acid (free acid) to suppress the dissolution of the active material of the positive electrode by fluoric acid. As a result, it is possible to obtain a nonaqueous electrolyte battery in which the movement and precipitation of the constituent element of the dissolved active material (for example, an ion of the transition metal element) to the negative electrode surface are suppressed, and the life performance resulting from resistance is improved.

The reason why the phosphorous compound is contained in the negative electrode rather than the positive electrode is that the active material of the negative electrode tends to bring water thereto and a large amount of fluoric acid (free acid) is produced near the negative electrode.

Hereinafter, the negative electrode, the nonaqueous electrolyte, the positive electrode, the separator, and the case will be described.

1) Negative Electrode

The negative electrode comprises a current collector and a negative electrode layer which is formed on one or both surfaces of the current collector and contains an active material.

The lithium absorption-release potential of the active material is not lower than 0.4 V (vs. Li/Li$^+$). Among active materials, a lithium titanium composite oxide is preferred. The lithium titanium composite oxide absorbs lithium ions in the vicinity of 1.5 V (vs. Li/Li$^+$). The lithium absorption-release potential of the active material is desirably lower than 0.4 V (vs. Li/Li$^+$). Other examples of the active material except the lithium titanium composite oxide include a lithium niobium composite oxide having a lithium absorption-release potential of 1 to 2 V (vs. Li/Li$^+$) such as Li$_x$Nb$_2$O$_5$ or Li$_x$NbO$_3$, a lithium molybdenum composite oxide having a lithium absorption-release potential of 2 to 3 V (vs. Li/Li$^+$) such as Li$_x$MoO$_3$, and a lithium iron composite sulfide having a lithium absorption-release potential of 1.8 V (vs. Li/Li$^+$) such as Li$_x$FeS$_2$. Here, x is preferably from 0 to 4.

Examples of the lithium titanium composite oxide include a lithium titanium oxide represented by Li$_{4+x}$Ti$_5$O$_{12}$ (x is 0 or more and 3 or less) or Li$_{2+y}$Ti$_3$O$_7$ (y is 0 or more and 3 or less), and a lithium titanium composite oxide in which a part of the constituent element of the lithium titanium oxide is substituted by a different type element.

TiO$_2$ or a titanium composite oxide containing Ti and at least one element selected from the group consisting of P, V, Sn, Cu, Ni, Co, and Fe can be used as the active material. These substances absorb lithium during the first charge and are converted to a lithium titanium composite oxide.

TiO$_2$ having a monoclinic β-type structure is preferred. Examples of the metal composite oxide containing Ti and at least one element selected from the group consisting of P, V, Sn, Cu, Ni, Co, and Fe include TiO$_2$—P$_2$O$_5$, TiO$_2$—V$_2$O$_5$, TiO$_2$—P$_2$O$_5$—SnO$_2$ and TiO$_2$—P$_2$O$_5$-MeO (Me represents at least one element selected from the group consisting of Cu, Ni, Co, and Fe). The metal composite oxides have preferably a micro-structure in which crystal and amolphous phases are coexist or an amolphous phase is present alone. The metal composite oxide having a micro-structure can significantly improve the cycle performance. Among them, the lithium titanium oxide and a metal composite oxide containing Ti and at least one element selected from the group consisting of P, V, Sn, Cu, Ni, Co, and Fe are preferred.

The average primary particle diameter of the active material is desirably 1 μm or less. However, when the average particle diameter is too small, a large part of the nonaqueous electrolyte is distributed in the negative electrode. This may cause depletion of the electrolyte at the positive electrode. Thus, the lower limit is preferably 0.001 μm.

It is desirable that the active material has an average primary particle diameter of 1 μm or less and the specific surface area measured by the BET adsorption method by N$_2$ adsorption is form 5 to 50 m$^2$/g. The active material can improve the impregnation properties of the nonaqueous electrolyte.

The active material having the specific surface area is advantageous in terms of improving the impregnation properties of the nonaqueous electrolyte. However, the active material having the specific surface area has a high affinity with water and brings water into the battery as it has a larger specific surface area. Thus, the resistance increase of the negative electrode resulting from water is facilitated as described above. In the embodiment, the phosphorous compound is contained in the nonaqueous electrolyte or the negative electrode as described above. Thus, even if the active material having the specific surface area is used, it is possible to obtain a nonaqueous electrolyte battery in which the resistance increase of the negative electrode resulting from water is suppressed and the life performance resulting from resistance is improved.

The porosity of the negative electrode layer is preferably set to a range of 20 to 50%. The negative electrode layer having porosity is excellent in affinity with the nonaqueous electrolyte and can have a high density. The porosity of the negative electrode is more preferably from to 25 to 40%.

The density of the negative electrode layer is desirably set to 2 g/cc or more. When the density is less than 2 g/cc, it may be difficult to obtain the negative electrode layer having the porosity of 20 to 50%. The density of the negative electrode layer is more preferably from 2 to 2.5 g/cc.

The current collector is preferably aluminum foil or aluminum alloy foil. The average crystal grain diameter of the current collector is preferably 50 μm or less. The strength of the collector can be dramatically increased. Thus, the negative electrode can be densified by high pressure and the capacity of the battery can be increased. Since the dissolution and corrosive deterioration of the current collector in the overdischarge cycle in the high temperature environment (at 40° C. or more) can be prevented, an increase in negative electrode impedance can be suppressed. Further, output characteristics, rapid charging, and charge and discharge cycle characteristics can be improved. The average crystal grain diameter is more preferably 30 μm or less, and still more preferably 5 μm or less.

The average crystal grain size is calculated as follows. The structure of the surface of the current collector is observed with an optical microscope and a crystal grain number n present in a region of 1 mm×1 mm is calculated. An average crystal grain area S is calculated from S=1× 10$^6$/n (μm$^2$) using the number n. An average crystal grain diameter d (μm) is calculated from the obtained value of S by Equation (1) below.

$$d=2(S/\pi)^{1/2} \qquad (1)$$

The aluminum foil or aluminum alloy foil having an average crystal grain diameter of 50 μm or less is influenced by many factors such as composition of materials, impurities, processing conditions, heat treatment histories, and annealing conditions. The crystal grain diameter is adjusted by combining the above-described various factors during the production process.

The thickness of the aluminum foil and the aluminum alloy foil is preferably 20 μm or less, and more preferably 15 μm or less. The purity of the aluminum foil is preferably 99% or more. Preferable examples of the aluminium alloy include alloys containing elements, such as magnesium, zinc, and silicon. On the other hand, the content of transition metals such as iron, copper, nickel, and chromium is preferably 1% or less.

The conductive agent is contained in the negative electrode layer together with the active material and it improves the current collection performance and reduces the contact resistance with the current collector. As the conductive agent, a carbon material, metal powder such as aluminum powder, and conductive ceramics such as TiO can be used. Examples of the carbon material include acetylene black, carbon black, corks, carbon fiber, and graphite. More preferable examples of the conductive agent include corks with a heat treatment temperature of 800 to 2000° C. and an average particle diameter of 10 μm or less, graphite, powder of TiO, and carbon fiber with an average particle diameter of 1 μm or less. The BET specific surface area, based on $N_2$ adsorption, of those carbon materials is preferably 10 $m^2/g$ or more.

The binder is contained in the negative electrode layer so as to bind the conductive agent to the active material. Examples of the binder include polytetrafluoroethylene (PTFE), polyvinylidene fluoride, fluorine rubber, styrene butadiene rubber, and a core shell binder.

As for the compounding ratio of the active material, the conductive agent and the binder, it is preferable that the content of the active material is 70% by mass or more and 96% by mass or less, the content of the conductive agent is 2% by mass or more and 28% by mass or less, the content of the binder is 2% by mass or more and 28% by mass or less. If the amount of the conductive agent is less than 2% by mass, the current collection performance of the negative electrode layer is lowered and high current characteristics of the nonaqueous electrolyte battery may be reduced. If the content of the binder is less than 2% by mass, the binding property of the negative electrode layer and the current collector is lowered and cycle characteristics may be reduced. On the other hand, from the viewpoint of performance of high capacity, the content of each of the conductive agent and the binder is preferably 28% by mass or less.

The negative electrode is produced by suspending, for example, the active material, conductive agent, and binder in a solvent to prepare a slurry, applying this slurry to the current collector, drying the slurry to form a negative electrode layer, and pressing the layer. The slurry is prepared in the following manner. First, the active material, conductive agent, and binder are added to a small amount of a solvent. The resultant mixture in the state of having a high solid ratio (the ratio of the active material, conductive agent, and binder to the solvent is high) is kneaded with a planetary mixer or the like to apply a high shear force thereto, thereby evenly dispersing the solid ingredients. In this operation, when the solid ratio is low, the shear force is lowered and the active material which has aggregated cannot be sufficiently pulverized. The solid ingredients are not evenly dispersed. The importance of this step becomes higher as the particle diameter of the active material becomes smaller. When particles having an average particle diameter of 1 μm or less are handled, that step is important. After the mixture in the state of having a high solid ratio has been sufficiently kneaded, a solvent is added thereto to gradually lower the solid ratio and adjust the resultant slurry so as to have a viscosity suitable for coating. This slurry having a viscosity suitable for coating is sufficiently mixed in a bead mill using ceramic balls as media. Through this step, edges of the active material particles are rounded, and the active material particles come to have a smooth surface. The active material particles thus treated can be packed at a high density and the pore size distribution can be shifted to the smaller-diameter side. Thus, a negative electrode having predetermined pore size distribution is obtained. Various materials such as glass, alumina, mullite, and silicon nitride can be used for the ceramic ball. From the viewpoint of wear resistance and impact resistance, a zirconia ball is preferred. The diameter of the ball is preferably from 0.5 to 5 mm. When the diameter of the ball is less than 0.5 mm, the impact strength is lowered. On the other hand, when the diameter of the ball is larger than 5 mm, the contact area between the media is decreased and thus the kneading capability is reduced. The diameter of the balls is more preferably from 1 to 3 mm.

The obtained slurry is applied to the current collector, which is dried and pressed with a roll presser to form a negative electrode. The roll temperature is preferably set to the range of 40 to 180° C. When the roll temperature is less than 40° C., the conductive agent having a specific gravity smaller than the active material is floated on the surface of the negative electrode layer at the time of pressing. As a result, a negative electrode layer having an appropriate pore size and a high density is not obtained. Thus, the impregnation properties of the electrolytic solution may be reduced. Further, the battery performance is reduced. When the roll temperature exceeds 180° C., the crystallization of the binder is progressed. Thus, the flexibility of the negative electrode layer is reduced and the layer may be broken or peeled off. As a result, the productivity is reduced and the battery performance such as output characteristics and charge-discharge cycle characteristics is reduced. The roll temperature is more preferably from 90 to 150° C.

As for the negative electrode having such a configuration, in another embodiment, the negative electrode layer contains at least one phosphorous compound selected from the group consisting of $A_xH_{3-x}PO_4$ (wherein A is at least one element selected from Na and K, and x is 0 or more and 3 or less) and $Ar'_yH_{(6-2y)}(PO_4)_2$ (wherein A' is at least one element selected from Mg and Ca, and y is 0 or more and 3 or less).

The effect by the phosphorous compound is in the order of K, Na, Mg, and Ca which are A or A'. The content of the phosphorous compound is preferably from 0.1 to 5% by mass based on the mass of the active material in the negative electrode layer. When the content of the phosphorous compound is set to less than 0.1% by mass, it becomes difficult to sufficiently achieve an effect of improving the life-time. On the other hand, when the content of the phosphorous compound is larger than 5% by mass, the ratio of the active material is decreased, which may reduce the negative electrode capacity. The content of the phosphorous compound is preferably from 0.5 to 3% by mass based on the mass of the active material.

2) Nonaqueous Electrolyte

The nonaqueous electrolyte is prepared by dissolving a fluorine-containing lithium salt as an electrolyte in a nonaqueous solvent and is an electrolyte in liquid at a room temperature (20° C.).

In the embodiment, the nonaqueous electrolyte contains at least one phosphorous compound selected from the group consisting of $A_xH_{3-x}PO_4$ (wherein A is at least one element selected from Na and K, and x is 0 or more and 3 or less) and $Ar'_yH_{(6-2y)}(PO_4)_2$ (wherein A' is at least one element selected from Mg and Ca, and y is 0 or more and 3 or less).

The content of the phosphorous compound is preferably 0.01% by mass or more and 5% by mass or less based on the total mass of the nonaqueous electrolyte before incorporating the nonaqueous electrolyte into the battery. When the content of the phosphorous compound is less than 0.01% by mass, the suppression effect of the resistance increase may not be obtained for a long period of time. On the other hand, when the content of the phosphorous compound is larger than 5% by mass, the electrical conductivity of the nonaqueous electrolyte is lowered, which may cause a decrease in high current performance. The content of the phosphorous compound is more preferably 0.2% by mass or more and 2% by mass or less.

The fluorine-containing lithium salt (an electrolyte) is dissolved in the nonaqueous solvent at a concentration of 0.5 mol/L or more and 2.5 mol/L or less.

Examples of the fluorine-containing lithium salt include lithium hexafluorophosphate (LiPF$_6$), lithium tetrafluoroborate (LiBF$_4$), lithium hexafluoroarsenate (LiAsF$_6$), lithium trifluoromethasulfonate (LiCF$_3$SO$_3$), and bistrifluoromethylsulfonylimide lithium [LiN(CF$_3$SO$_2$)$_2$]. The fluorine-containing lithium salt can be used alone or a mixture of two or more types thereof. As the fluorine-containing lithium salt, LiBF$_4$ or LiPF$_6$, which is less apt to be oxidized even at high potentials, is most preferred.

Examples of the nonaqueous solvent include cyclic carbonates such as propylene carbonate (PC), ethylene carbonate (EC), and vinylene carbonate; chain carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); chain ethers such as dimethoxyethane (DME) and diethoethane (DEE); and γ-butyrolactone (GBL), acetonitrile (AN), sulfolane (SL). These solvents can be used alone or as a mixed solvent thereof.

A preferred nonaqueous solvent is a mixed solvent obtained by mixing at least two of the group consisting of propylene carbonate (PC), ethylene carbonate (EC), and γ-butyrolactone (GBL). A still more preferred nonaqueous solvent is a mixed solvent containing γ-butyrolactone (GBL). This is based on the following reasons.

(1) γ-butyrolactone, propylene carbonate, and ethylene carbonate have a high boiling point and flash point and are excellent in thermal stability.

(2) γ-butyrolactone is easily reduced as compared with linear or cyclic carbonates. The mixed solvent containing γ-butyrolactone and sultones having an unsaturated hydrocarbon group can form a more stable protective coating on the negative electrode surface during the reduction. Specifically, γ-butyrolactone>>>ethylene carbonate>propylene carbonate>>dimethyl carbonate>methylethyl carbonate>diethyl carbonate is easily reduced in this preferential order. They become a suitable solvent in this order. It is shown that as the number of the mark > is large, there is a difference in reactivity between solvents.

Therefore, when γ-butyrolactone is contained in a nonaqueous electrolyte, the γ-butyrolactone is slightly decomposed in the operating potential region of the lithium titanium composite oxide (which is the active material of the negative electrode) and a preference coating is formed on the surface of the lithium titanium composite oxide. The same holds true for the above-described mixed solvent.

In order to form a protective coating on the negative electrode surface, it is preferable that the content of γ-butyrolactone is set to 40% by volume or more and 95% by volume or less based on the organic solvent.

The nonaqueous electrolyte containing γ-butyrolactone exhibits the excellent effect described above. However, the viscosity thereof is high and thus the impregnation properties to the negative electrode are reduced. However, when the active material of the negative electrode having an average particle diameter of 1 μm or less is used, even if the nonaqueous electrolyte containing γ-butyrolactone is used, the nonaqueous electrolyte can be smoothly impregnated. As a result, the productivity, output characteristics, and charge-discharge cycle characteristics can be improved.

3) Positive Electrode

The positive electrode comprises a current collector and a positive electrode layer which is formed on one or both surfaces of the current collector and contains an active material.

Examples of the active material include oxides, sulfides, and polymers.

Examples of the oxides include manganese dioxide (MnO$_2$), iron oxide, copper oxide, and nickel oxide, each of which may be capable of absorbing lithium; lithium manganese composite oxides (e.g. Li$_x$Mn$_2$O$_4$ or Li$_x$MnO$_2$); lithium nickel composite oxides (e.g. Li$_x$NiO$_2$); lithium cobalt composite oxides (Li$_x$CoO$_2$); lithium nickel cobalt composite oxides (e.g. LiNi$_{1-y}$Co$_y$O$_2$); lithium manganese cobalt composite oxides (e.g. LiMn$_y$Co$_{1-y}$O$_2$); spinel-type lithium manganese nickel composite oxides (LixMn$_{2-y}$Ni$_y$O$_4$); lithium phosphorus oxides having an olivine structure (Li$_x$FePO$_4$, Li$_x$Fe$_{1-y}$Mn$_y$PO$_4$, and Li$_x$CoPO$_4$); iron sulfate (Fe$_2$(SO$_4$)$_3$); vanadium oxides (e.g. V$_2$O$_5$); and lithium nickel cobalt manganese composite oxides. Here, it is preferable that x is 0 or more and 1 or less and y is 0 or more and 1 or less.

As the polymer, for example, conductive polymer materials such as polyaniline or polypyrrole or disulfide-based polymer materials can be used. In addition to the above materials, sulfur (S), carbon fluoride or the like can be used.

Active materials such as lithium manganese composite oxides (Li$_x$Mn$_2$O$_4$), lithium nickel composite oxides (Li$_x$NiO$_2$), lithium cobalt composite oxides (Li$_x$CoO$_2$), lithium nickel cobalt composite oxides (LiNi$_{1-y}$Co$_y$O$_2$), lithium-manganese-nickel composite oxides having a Spinel structure (Li$_x$Mn$_{2-y}$Ni$_y$O$_4$), lithium manganese cobalt composite oxides (LiMn$_y$Co$_{1-y}$O$_2$), lithium iron phosphate (Li$_x$FePO$_4$), or lithium nickel cobalt manganese composite oxides are preferred because a high positive electrode potential is obtained. It is preferable that x is 0 or more and 1 or less and y is 0 or more and 1 or less.

It is preferable that the composition of the lithium nickel cobalt manganese composite oxide is Li$_a$Ni$_b$Co$_c$Mn$_d$O$_2$ (wherein molar ratios a, b, c, and d are 0≤a≤1.1, 0.1≤b≤0.5, 0≤c≤0.9, and 0.1≤d≤0.5, respectively).

In the embodiment, when the lithium transition metal oxides such as LiCoO$_2$ or LiMn$_2$O$_4$ are used as the active material, the phosphorous compound is slightly oxidized and decomposed. Thus, the positive electrode surface may be contaminated. In this case, these influences are minimized by coating a part or all of the surface of the lithium transition metal composite oxide particles with at least one element selected from the group consisting of Al, Mg, Zr, B, Ti, and Ga in an oxide form, whereby a nonaqueous electrolyte battery having a longer life is obtained. Examples of the oxides include Al$_2$O$_3$, MgO, ZrO$_2$, B$_2$O$_3$, TiO$_2$, and Ga$_2$O$_3$. The presence of such an oxide in the active material allows the oxidative decomposition of the nonaqueous electrolyte on the surface to be inhibited, even if the nonaqueous electrolyte contains the phosphorous compound, whereby battery life prolongation is possible.

An oxide of at least one element selected from the group consisting of Al, Mg, Zr, B, Ti, and Ga may have any mass ratio based on the lithium transition metal composite oxide. It is preferably 0.1% by mass or more and 15% by mass or less, and more preferably 0.3% by mass or more and 5% by mass or less based on the lithium transition metal composite oxide. When the amount of the oxide is less than 0.1% by mass, the lithium transition metal composite oxide is not substantially changed. Thus, it is not possible to sufficiently exert the effect of allowing the oxide to be present. On the other hand, when the amount of the oxide is larger than 15% by mass, the capacity of the nonaqueous electrolyte battery including a positive electrode which contains the lithium transition metal composite oxide as the active material may be reduced.

In the embodiment, the active material may contain lithium transition metal composite oxide particles whose surface is coated with the oxide and lithium transition metal composite oxide particles whose surface is not coated with the oxide.

Among oxides of at least one element selected from the group consisting of Al, Mg, Zr, B, Ti, and Ga, it is preferred to use MgO, $ZrO_2$, or $B_2O_3$. If the lithium transition metal composite oxide is used as the active material of the positive electrode, the charging voltage can be increased up to (e.g. 4.4 V) and charge-discharge cycle characteristics can be improved.

The lithium transition metal composite oxide may contain inevitable impurities.

In order to coat the lithium transition metal composite oxide particles with the oxide, the lithium transition metal composite oxide particles are impregnated with a solution containing ions of at least one element selected from the group consisting of Al, Mg, Zr, B, Ti, and Ga, followed by sintering the lithium transition metal composite oxide particles impregnated with the element ions. The form of the solution to be used for impregnation is not particularly limited as long as the oxide of at least one element selected from the group consisting of Al, Mg, Zr, B, Ti, and Ga can be attached to the surface of the lithium transition metal composite oxide after sintering. A solution containing at least one element selected from the group consisting of Al, Mg, Zr, B, Ti, and Ga in an appropriate form can be used. Examples of the form of these metals (including boron) include oxynitrates of element M, nitrates of element M, acetates of element M, sulfates of element M, carbonates of element M, hydroxides of element M, and acids of element M. The element M is at least one element selected from the group consisting of Al, Mg, Zr, B, Ti, and Ga.

Particularly, in a preferred embodiment, when MgO, $ZrO_2$, or $B_2O_3$ is used as an oxide, M ions are preferably Mg ions, Zr ions or B ions. It is more preferable that a solution containing M ions is, for example, an $Mg(NO_3)_2$ aqueous solution, a $ZrO(NO_3)_2$ aqueous solution, a $ZrCO_4 \cdot ZrO_2 \cdot 8H_2O$ aqueous solution, a $Zr(SO_4)_2$ aqueous solution or an $H_3BO_3$ aqueous solution. Among them, the $Mg(NO_3)_2$ aqueous solution, $ZrO(NO_3)_2$ aqueous solution or $H_3BO_3$ aqueous solution is most preferred for use. The concentration of the aqueous solution of M ions is not particularly limited. Since the volume of the solution can be reduced in the impregnation process, a saturated solution is preferred.

In the embodiment, examples of the form of M ions in the aqueous solution include not only ions of element M alone but also ions made up of element M and other element(s) bonded thereto. In the case of boron, for example, examples of the ions include $B(OH)_4^-$.

When the lithium transition metal composite oxide is impregnated with an aqueous solution of M ions, the mass ratio of the lithium transition metal composite oxide and the aqueous solution of M ions is not particularly limited. It may be a mass ratio according to the composition of the lithium transition metal composite oxide to be produced. The impregnation time may be a time that can sufficiently perform the impregnation. The impregnation temperature is not particularly limited.

The lithium transition metal composite oxide is obtained by sintering the impregnated particles. In the step, the sintering temperature and the sintering time can be suitably selected. It is preferable that the sintering temperature is from 400 to 800° C. and the sintering time is from 1 to 5 hours. It is particularly preferable that the sintering temperature is 600° C. and the sintering time is 3 hours. The sintering may be performed in an oxygen stream or in the air. Although the particles after impregnation may be directly sintered, the particles are preferably dried before sintering to remove the water content. The drying can be performed by a usually known method. For example, heating in an oven, hot-air drying, and the like can be used alone or in combination of two or more thereof. It is preferable that the drying is performed in an atmosphere such as oxygen or air.

The obtained lithium transition metal composite oxide may be ground, if necessary.

The primary particle diameter of the active material is preferably 100 nm or more and 1 μm or less. When the primary particle diameter of the active material is 100 nm or more, the handling in the industrial production is easy. On the other hand, when the primary particle diameter of the active material is set to 1 μm or less, diffusion in solid of lithium ions can proceed smoothly.

The specific surface area of the active material is preferably from 0.1 $m^2/g$ or more and 10 $m^2/g$ or less. When the specific surface area of the active material is set to 0.1 $m^2/g$ or more, the absorption and release site of lithium ions can be sufficiently ensured. When the specific surface area of the active material is set to 10 $m^2/g$ or less, the handling in the industrial production is made easy and excellent charge discharge cycle performance can be ensured.

The conductive agent is contained in the positive electrode layer together with the active material and it improves the current collection performance and reduces the contact resistance with the current collector. Examples of the conductive agent include carbonaceous materials such as acetylene black, carbon black, and graphite.

The binder is further contained in the positive electrode layer to bind the conductive agent to the active material. Examples of the binder include polytetrafluoroethylene (PTFE), polyvinylidene fluoride, and fluorine-based rubber.

As for the compounding ratio of the active material, the conductive agent, and the binder, it is preferable that the content of the active material is 80% by mass or more and 95% by mass or less, the content of the conductive agent is 3% by mass or more and 18% by mass or less, the content of the binder is 2% by mass or more and 17% by mass or less. When the amount of the conductive agent is 3% by mass or more, the above effect can be obtained. When the amount of the conductive agent is 18% by mass or less, decomposition of the nonaqueous electrolyte on a surface of the conductive agent under high temperature storage can be reduced. When the amount of the binder is 2% by mass or more, sufficient electrode strength is obtained. When the amount of the binder is 17% by mass or less, the amount of the insulating material of the electrode can be reduced, leading to reduced internal resistance.

The current collector is preferably aluminum foil or aluminum alloy foil. As with the current collector, the average crystal grain diameter is preferably 50 μm or less, more preferably 30 μm or less, and still more preferably 5 μm or less. When the average crystal grain diameter is 50 μm or less, the strength of the aluminum foil or aluminum alloy foil can be dramatically increased. Thus, it becomes possible to densify the positive electrode by high pressure. As a result, the capacity of the battery can be increased.

The aluminum foil or aluminum alloy foil having an average crystal grain diameter of 50 μm or less is influenced by a plurality of factors such as structures of materials, impurities, processing conditions, heat treatment histories, and annealing conditions. The crystal grain diameter is adjusted by combining the above-described various factors during the production process.

The thickness of the aluminum foil and the aluminum alloy foil is, for example, 20 μm or less, and more preferably 15 μm or less. The purity of the aluminum foil is preferably 99% or more. Preferable examples of the aluminium alloy include alloys containing elements, such as magnesium, zinc, and silicon. On the other hand, the content of transition metals such as iron, copper, nickel, and chromium contained in the aluminum alloy is preferably set to 1% or less.

The positive electrode is produced by suspending, for example, an active material, a conductive agent, and a binder in an appropriate solvent to prepare a slurry, applying the slurry to the current collector, drying it to form a positive electrode layer, and pressing it. The positive electrode layer produced by allowing the active material, the conductive agent, and the binder to be formed into a pellet shape may be used.

4) Separator

Examples of the separator include porous films and nonwoven fabrics of synthetic resins. The porous films may contain at least one kind of material selected from the group consisting of polyethylene, polypropylene, cellulose, and polyvinylidene fluoride. Particularly, a separator containing cellulose is preferred because it is low cost and has a high permeability of lithium ions, thereby having high output characteristics.

Although the separator containing cellulose has the significant effect as described above, it has a hydroxyl group at the end and has properties which tend to bring water into the battery. Accordingly, the resistance increase of the negative electrode resulting from water is facilitated. In the embodiment, the phosphorous compound is contained in the nonaqueous electrolyte or the negative electrode as described above. Thus, even if the separator containing cellulose is used, it is possible to obtain a nonaqueous electrolyte battery in which the resistance increase of the negative electrode resulting from water is suppressed and the life performance resulting from resistance is improved.

In the separator, the pore median diameter measured by a mercury porosimetry is preferably 0.15 μm or more and 2.0 μm or less. When the pore median diameter is less than 0.15 μm, the film resistance of the separator is increased and thus the output power may be reduced. On the other hand, when the pore median diameter is more than 2.0 μm, the shutdown due to the shrinkage of the separator does not uniformly occur and thus the safety may be reduced. In addition, the diffusion of the nonaqueous electrolyte due to capillary action hardly occurs. Thus, cycle degradation due to the depletion of the nonaqueous electrolyte may be induced. The pore median diameter is more preferably 0.18 μm or more and 0.40 μm or less.

In the separator, a pore mode diameter measured by a mercury porosimetry is preferably 0.12 μm or more and 1.0 μm or less. When the pore mode diameter is less than 0.12 μm, the film resistance of the separator is increased, which may result in reduction in the output power. Further, the separator is deteriorated in high-temperature and high-voltage environments and the pore is crushed, which may result in reduction in the output power. On the other hand, when the pore mode diameter is more than 1.0 μm, the shutdown due to the shrinkage of the separator does not uniformly occur. Thus the safety may be reduced. The pore mode diameter is more preferably 0.18 μm or more and 0.35 μm or less.

The porosity of the separator is preferably 45% or more and 75% or less. When the porosity is less than 45%, the absolute amount of ions in the separator is decreased, which may result in reduction in the output power. When the porosity is more than 75%, the strength of the separator is decreased and further the shutdown does not uniformly occur. Thus the safety may be reduced. The porosity is more preferably 50% or more and 65% or less.

5) Case

Examples of the case include a laminate film case having a thickness of 0.2 mm or less and a metal container having a thickness of 1.0 mm or less. The thickness of the metal container is more preferably 0.5 mm or less.

Examples of the shape of the case include flat-type, rectangular-type, cylindrical-type, coin-type, button-type, sheet-type, and lamination-type shapes. The size of the case may be a size suitable for a small battery which is loaded into a portable electronic device or a large battery which is loaded into a two- or four-wheeled vehicle.

The laminate film is a multilayer film including a metal layer and a resin layer which covers the metal layer. The metal layer is preferably aluminum foil or aluminum alloy foil in order to reduce the weight. The resin layer is used to reinforce the metal layer and can be formed of polymer materials such as polypropylene (PP), polyethylene (PE), nylon, and polyethylene terephthalate (PET). The laminate film case can be formed by heat sealing.

It is preferable that the metal container is formed from aluminium, an aluminum alloy or the like. Preferable examples of the aluminium alloy include alloys containing elements, such as magnesium, zinc, or silicon. The content of transition metals such as iron, copper, nickel, and chromium, contained in the aluminum alloy is set to preferably 1% by mass or less. The metal container formed of aluminium or an aluminum alloy allows the long-term reliability in the high temperature environment and heat releasing property to be dramatically improved.

The metal container formed of aluminium or an aluminum alloy has preferably an average crystal grain diameter of 50 μm or less, more preferably 30 μm or less, and still more preferably 5 μm or less. When the average crystal grain diameter is set to 50 μm or less, the strength of the metal container comprised of aluminium or an aluminium alloy can be dramatically increased, which allows the container to be thinner. As a result, a nonaqueous electrolyte battery which is light-weight, has high output, exhibits long-term reliability, and is suitable battery to be mounted on vehicles can be realized.

Figure 1:
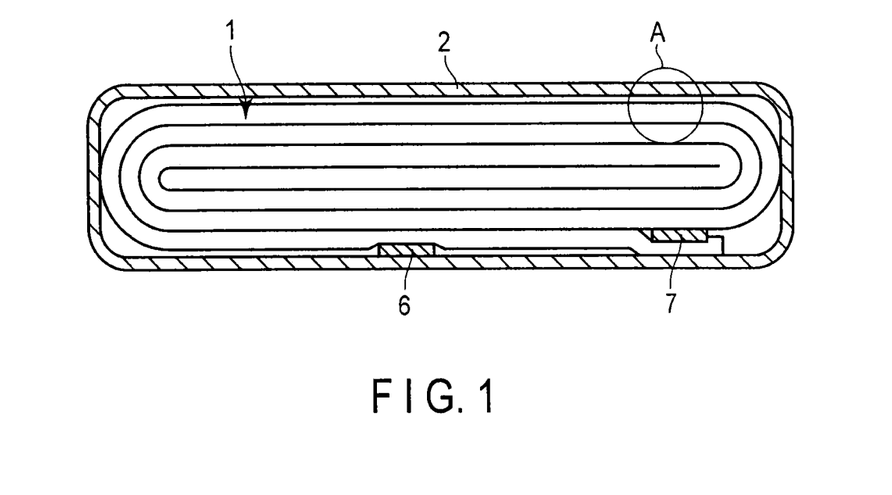
FIG. 1 is a cross-sectional schematic view of the flat-type nonaqueous electrolyte battery according to the embodiment.
Figure 2:
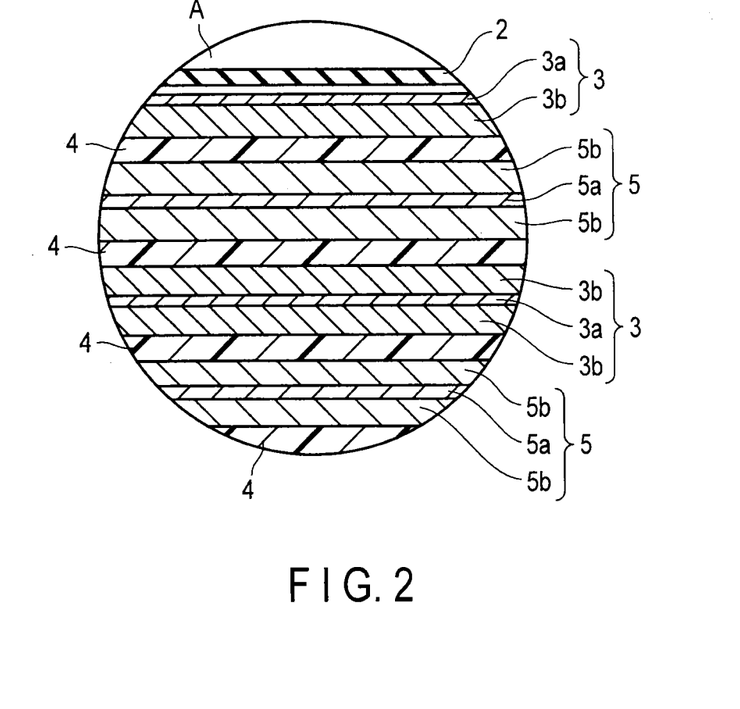
FIG. 2 is an enlarged cross-sectional view of the A part of FIG. 1.

Subsequently, the nonaqueous electrolyte battery according to the embodiment will be specifically described with reference to FIGS. 1 and 2. FIG. 1 is a cross-sectional view of a flat-type nonaqueous electrolyte secondary battery according to the embodiment. FIG. 2 is an enlarged sectional view of a portion A of FIG. 1. The same reference numerals denote common portions throughout the embodiments and overlapped description is not repeated. Each drawing is a pattern diagram to facilitate the description of the embodiment and its understanding. The shape, size, and ratio thereof are different from those of an actual device. However, they can be appropriately designed and modified by taking into consideration the following description and known techniques.

A flat-shaped wound electrode group 1 is housed in a bag-shaped case 2 formed of a laminate film in which a metal layer is provided between two resin films. The flat-shaped wound electrode group 1 is formed by spirally winding a laminate obtained by stacking a negative electrode 3, a separator 4, a positive electrode 5, and the separator 4 in this order from the outside and subjecting it to press-molding. As shown in FIG. 2, the negative electrode 3 of an outermost shell has a configuration in which a negative electrode layer 3b which contains the lithium titanium composite oxide as the active material is formed at one side of a current collector 3a. Other negative electrodes 3 are configured to form the negative electrode layer 3b at both sides of the current collector 3a. The positive electrode 5 is configured to form the positive electrode layer 5b at both sides of a current collector 5a.

Near the peripheral edge of the wound electrode group 1, a negative electrode terminal 6 is connected to the current collector 3a of the negative electrode 3 of an outermost shell, and a positive electrode terminal 7 is connected to the current collector 5a of the positive electrode 5 at the inner side. The negative electrode terminal 6 and the positive electrode terminal 7 are extended outwardly from an opening of the bag-shaped case 2. For example, a nonaqueous electrolyte is injected from the opening of the bag-shaped case 2. The wound electrode group 1 and the nonaqueous electrolyte can be sealed by heat-sealing the opening of the bag-shaped case 2 across the negative electrode terminal 6 and the positive electrode terminal 7.

The negative electrode terminal can be formed of, for example, a material having electrical stability and conductivity in a potential range (0.4 to 3 V vs. Li/Li$^+$). Specific examples thereof include an aluminium alloy containing elements such as Mg, Ti, Zn, Mn, Fe, Cu, or Si; and aluminium. In order to reduce the contact resistance, the same material as that of the current collector is preferred.

The positive electrode terminal can be formed of, for example, a material having electrical stability and conductivity in a potential range (3 to 5 V vs. Li/Li$^+$). Specific examples thereof include an aluminium alloy containing elements such as Mg, Ti, Zn, Mn, Fe, Cu, or Si; and aluminium. In order to reduce the contact resistance, the same material as that of the current collector is preferred.

Figure 3:
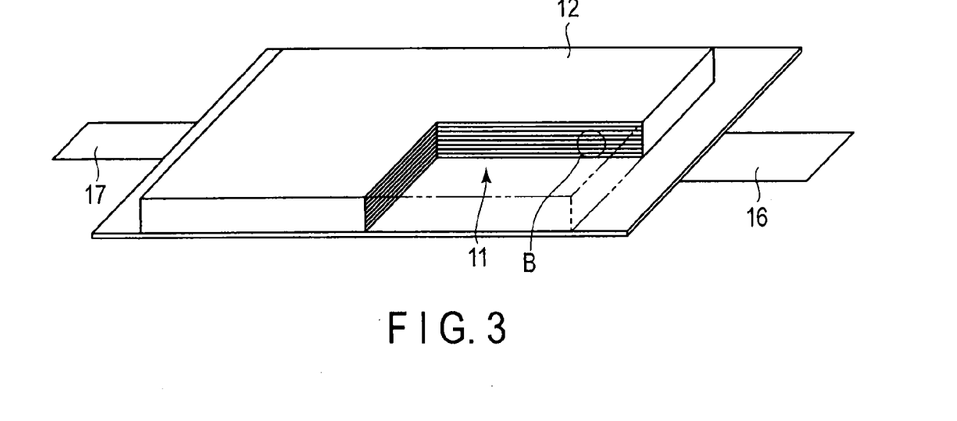
FIG. 3 is an oblique view, partly broken away, schematically showing another flat-type nonaqueous electrolyte battery according to the embodiment.
Figure 4:
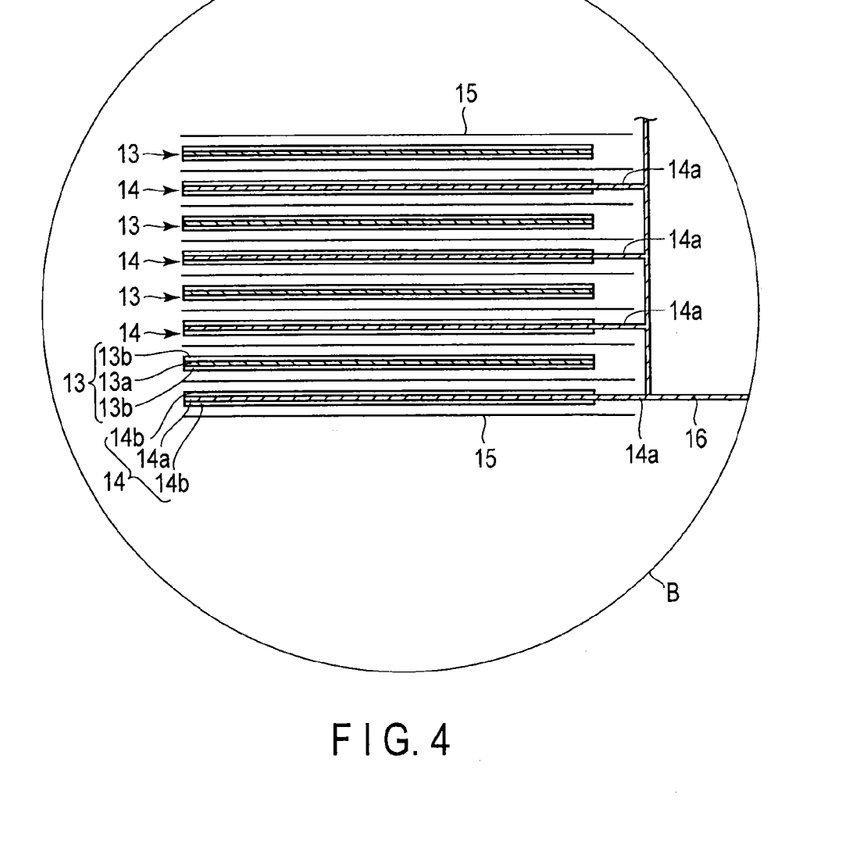
FIG. 4 is an enlarged cross-sectional schematic view of the B part of FIG. 3.

The nonaqueous electrolyte battery according to the embodiment may have not only the configurations shown in FIGS. 1 and 2, but also the configurations shown in FIGS. 3 and 4. FIG. 3 is a partially notched perspective view typically showing another flat type nonaqueous electrolyte secondary battery according to the embodiment. FIG. 4 is an enlarged sectional view of a portion B of FIG. 3.

A lamination-type electrode group 11 is housed in a bag-shaped case 12 formed of a laminate film in which a metal layer is provided between two resin films. As shown in FIG. 4, the lamination-type electrode group 11 has a structure in which a positive electrode 13 and a negative electrode 14 are alternately stacked while a separator 15 is interposed between the both electrodes. A plurality of the positive electrodes 13 are present and they each comprise a current collector 13a and a positive electrode layer 13b formed at both sides of the current collector 13a. A plurality of the negative electrodes 14 are present and they each comprise a current collector 14a and a negative electrode layer 14b formed at both sides of the current collector 14a. In each of the current collectors 14a of the negative electrodes 14, a side is protruded from the positive electrode 13. The protruded collector 14a is electrically connected to a belt-like negative electrode terminal 16. The distal end of the belt-like negative electrode terminal 16 is externally drawn from the case 12. In the current collector 13a of the positive electrode 13, not illustrated, one side located at the opposite side of the protruded side of the collector 14a is protruded from the negative electrode 14. The current collector 13a protruded from the negative electrode 14 is electrically connected to a belt-like positive electrode terminal 17. The distal end of the belt-like positive electrode terminal 17 is located at the opposite side of the negative electrode terminal 16 and externally drawn from the case 12.

The battery pack according to the embodiment comprises a plurality of the nonaqueous electrolyte batteries. These batteries are electrically connected in series or in parallel to form a battery module. The battery pack may include both of the batteries electrically connected in series and the batteries electrically connected in parallel.

The battery pack will be described in detail with reference to FIGS. 5 and 6. As the unit cell, the flat-type battery shown in FIG. 1 can be used.

A battery module 23 is configured by stacking a plurality of unit cells 21 formed of the flat-shaped nonaqueous electrolyte battery shown in FIG. 1 so that the negative electrode terminal 6 and the positive electrode terminal 7 that are extended externally are arranged in the same direction. The plurality of unit cells 21 are fastened with an adhesive tape 22. The unit cells 21 are electrically connected in series with one another as shown in FIG. 6.

A printed circuit board 24 is arranged opposed to the side plane of the unit cells 21 where the negative electrode terminal 6 and the positive electrode terminal 7 are extended. A thermistor 25, a protective circuit 26, and an energizing terminal 27 to an external instrument are mounted on the printed circuit board 24 as shown in FIG. 6. An electrical insulating plate (not shown) is attached to the surface of the protective circuit board 24 facing the battery module 23 to avoid unnecessary connection of the wiring of the battery module 23.

A positive electrode lead 28 is connected to the positive electrode terminal 7 located at the bottom layer of the battery module 23 and the distal end is inserted into a positive electrode connector 29 of the printed circuit board 24 so as to be electrically connected. A negative electrode lead 30 is connected to the negative electrode terminal 6 located at the top layer of the battery module 23 and the distal end is inserted into an negative electrode connector 31 of the printed circuit board 24 so as to be electrically connected. The connectors 29 and 31 are connected to the protective circuit 26 through conductors 32 and 33 formed in the printed circuit board 24.

The thermistor 25 detects the temperature of the unit cells 21 and the detection signal is sent to the protective circuit 26. The protective circuit 26 can shut down a positive conductor 34a and a negative conductor 34b between the protective circuit 26 and the energizing terminals 27 to an external instrument under a predetermined condition. For example, the predetermined condition indicates when the detection temperature of the thermistor 25 becomes more than a predetermined temperature. Further, the predetermined condition indicates when the overcharge, overdischarge, and over-current of the unit cells 21 are detected. The detection of overcharge and the like may be performed on each of the unit cells 21 or the battery module 23. When each of the unit cells 21 is detected, the cell voltage may be detected, or positive electrode or negative electrode potential may be detected. In the case of the latter, a lithium electrode to be used as a reference electrode is inserted into each of the unit cells 21. In the case of FIGS. 5 and 6, conductors 35 for voltage detection are connected to the unit cells 21 and detection signals are sent to the protective circuit 26 through the conductors 35.

Protective sheets 36 comprised of rubber or resin are arranged on three side planes of the battery module 23 except the side plane in which the positive electrode terminal 7 and the negative electrode terminal 6 are protruded.

The battery module 23 is housed in a housing container 37 together with each of the protective sheets 36 and the printed circuit board 24. That is, the protective sheets 36 are arranged on both internal surfaces in a long side direction and on one internal surface in a short side direction of the housing container 37. The printed circuit board 24 is arranged on the other internal surface in a short side direction. The battery module 23 is located in a space surrounded by the protective sheets 36 and the printed circuit board 24. A lid 38 is attached to the upper surface of the housing container 37.

Alternatively, the battery module 23 may be fixed by using a heat shrink tape instead of the adhesive tape 22. In this case, the protective sheets are disposed on both side surfaces of the battery module, the battery module is wound around a heat shrink tube, and the heat shrink tube is shrank by heating to bind the battery module.

Figure 5:
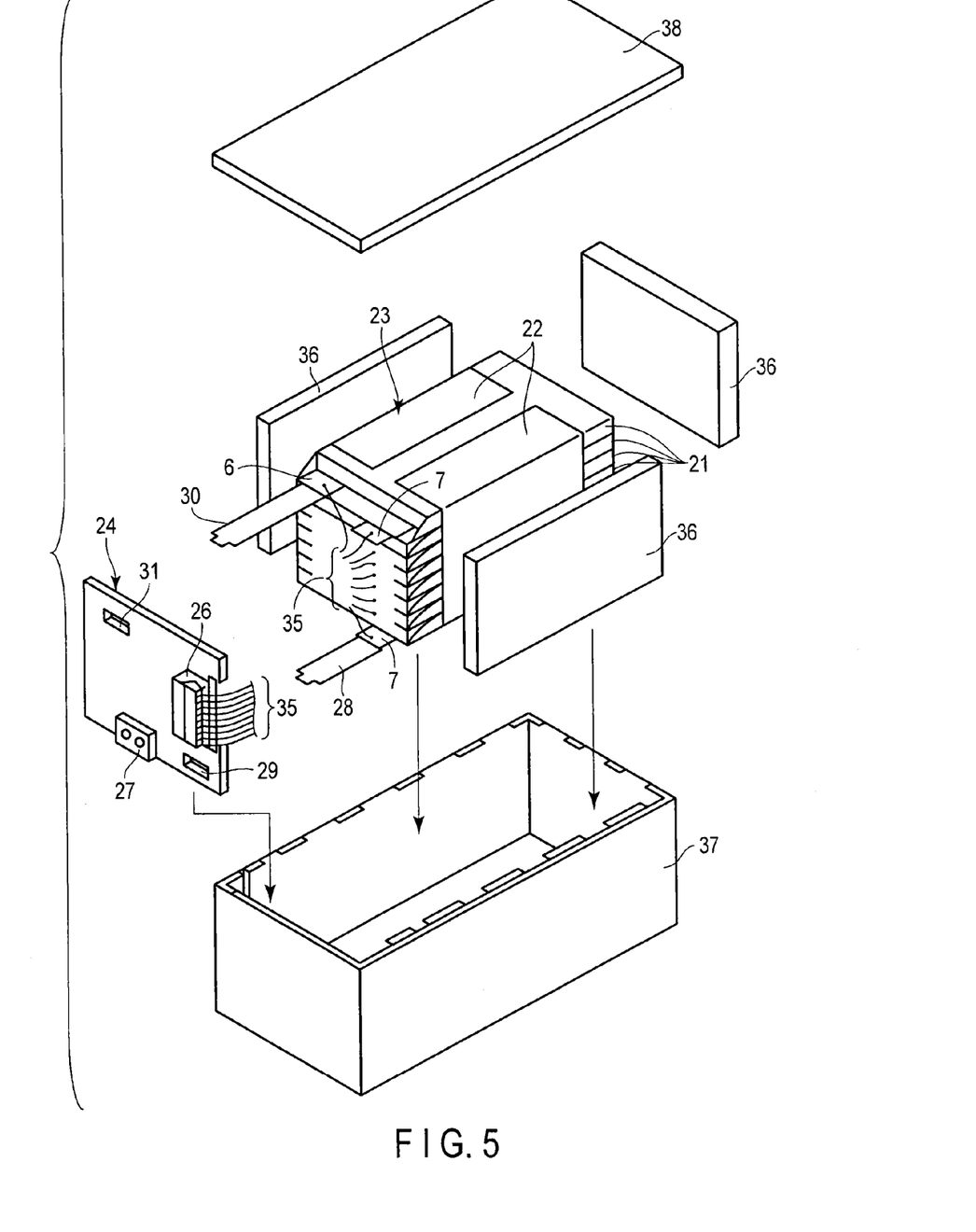
FIG. 5 is an exploded perspective view of the battery pack according to the embodiment.
Figure 6:
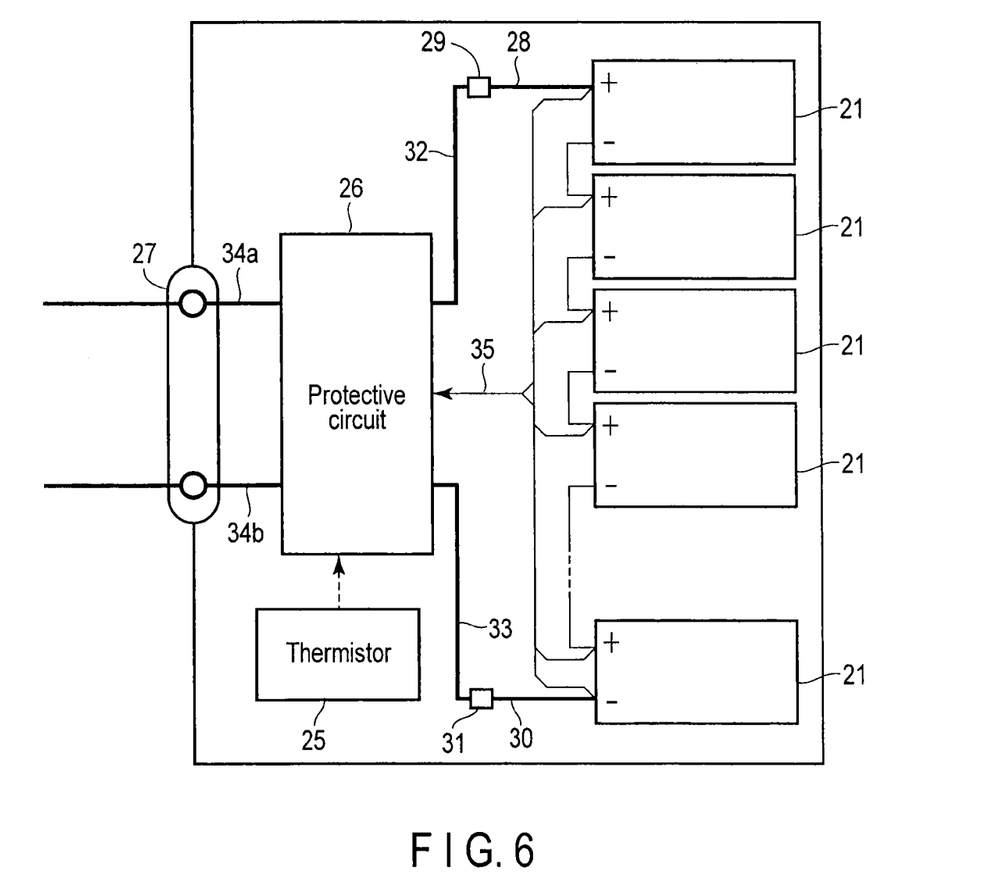
FIG. 6 is a block diagram showing the electrical circuit of the battery pack of FIG. 5.

In FIGS. 5 and 6, the unit cells 21 are connected in series. However, in order to increase the battery capacity, the cells may be connected in parallel. The assembled battery pack can be connected in series or in parallel.

The embodiment of the battery pack is appropriately changed according to the use. As the use of the battery pack, the use to expect cycle characteristics at high rate is preferred. Specifically, the use of the battery pack for power sources for digital cameras, the use of the battery pack for vehicles such as two- or four-wheel hybrid electric vehicles, two- or four-wheel electric vehicles, and assisted bicycles or the like are listed. Particularly, automobile use is preferred.

In this regard, a mixed solvent obtained by mixing at least two or more kinds of the group consisting of propylene carbonate (PC), ethylene carbonate (EC), and γ-butyrolactone (GBL) or a nonaqueous electrolyte containing γ-butyrolactone (GBL) is preferably used for the application which requires high temperature characteristics. Specifically, the use of the battery pack for vehicles is listed.

EXAMPLES

Hereinafter, examples will be described. The embodiment is not limited to the following examples without departing from the spirit of the embodiment.

Example 1

Production of Positive Electrode

90% by mass of lithium manganese oxide ($LiMn_2O_4$) powder as an active material, 3% by mass of acetylene black and 3% by mass of graphite as conductive agents, and 4% by mass of polyvinylidene fluoride as a binder were added to N-methylpyrrolidone (NMP), which was mixed to prepare a slurry. The slurry was applied to both sides of a current collector formed of a 15-micrometer-thick aluminum foil, followed by drying and pressing to produce a positive electrode having an electrode density (density of the positive electrode layer) of 3.0 g/cm³.

<Production of Negative Electrode>

Spinel-type lithium titanate ($Li_4Ti_5O_{12}$) powder having an average particle diameter of 0.84 μm, a BET specific surface area of 10.8 m²/g, and a lithium absorption potential of 1.55 V (vs. Li/Li$^+$) was prepared as an active material. The particle diameter of the active material was measured using a laser diffraction type distribution measurement device (SALD-300, Shimadzu Corporation). That is, about 0.1 g of a sample, a surfactant, and 1 to 2 mL of distilled water were added to a beaker and sufficiently stirred. The mixture was placed to an agitation bath and the luminous intensity distribution was measured at intervals of 2 seconds 64 times. The particle diameter of the active material was determined by analyzing particle size distribution data.

N-methylpyrrolidone (NMP) was added to 90% by mass of the active material, 5% by mass of graphite as a conductive agent, 5% by mass of polyvinylidene fluoride as a binder so as to have a solid content ratio of 62% by mass. The mixture was kneaded with a planetary mixer. The solid ratio was gradually reduced by adding NMP thereto to prepare a slurry having a viscosity of 10.2 cp (value measured with a Brookfield viscometer at 50 rpm). The slurry was mixed in a bead mill using zirconia balls having a diameter of 1 mm as media.

The obtained slurry was applied to both sides of a current collector formed of a 15-micrometer-thick aluminum foil (purity: 99.3%, average crystal grain diameter: 10 μm), followed by drying and pressing to produce a negative electrode having an electrode density (density of the negative electrode layer) of 2.3 g/cm³.

<Production of Electrode Group>

A positive electrode, a separator comprised of a polyethylene porous film with a thickness of 25 μm, a negative electrode, and a separator were stacked in this order, which was spirally wound. The resultant product was hot-pressed at 80° C. to produce a flat type electrode group having a height of 50 mm, a width of 33 mm, and a thickness of 3.3 mm. The obtained electrode group was housed in a case which is formed of a laminate film having a thickness of 0.1 mm and a three-layered structure of a nylon layer, an aluminum layer, and a polyethylene layer and vacuum-dried at 80° C. for 24 hours.

<Preparation of Nonaqueous Electrolyte>

A nonaqueous electrolyte was prepared by dissolving 2.0 mol/L of $LiBF_4$ as an electrolyte in a mixed solvent (volume ratio 1:2) of ethylene carbonate (EC) and γ-butyrolactone (GBL), and adding 0.5% by mass of $H_3PO_4$ based on the total mass of the mixed solvent and the electrolyte. In the nonaqueous electrolyte, the viscosity at 20° C. was 7.1 cp (measured with a Brookfield viscometer).

A nonaqueous electrolyte secondary battery was produced by injecting a nonaqueous electrolyte to the laminated film case in which the electrode group was housed, performing the first cycle charge and discharge, collecting gas, and sealing the case by heat sealing. The secondary battery had a structure shown in FIG. 1, a width of 35 mm, a length of 65 mm, and a thickness of 3.6 mm.

Comparative Example 1 and Examples 2 to 8

Nonaqueous electrolyte secondary batteries were produced in the same manner as described in Example 1 except that the content of $H_3PO_4$ in the nonaqueous electrolyte was the amount shown in Table 1 below.

The obtained batteries of Examples 1 to 8 and Comparative Example 1 were subjected to a high temperature storage test conducted in a 85% charge (SOC85%) state at 60° C. for 3 months. After the storage, the battery resistance was measured and the resistance increasing rate was determined by the equation, X=R1/R2, where X is the resistance increasing rate, R1 is the resistance after the storage, and R2 is the resistance before the storage. The results are shown in Table 1 below.

TABLE 1

|  | Phosphorous compound | Content (% by mass) | Resistance increasing rate (fold) |
|---|---|---|---|
| Example 1 | $H_3PO_4$ | 0.5 | 1.33 |
| Comparative Example 1 | — | — | 2.00 |
| Example 2 | $H_3PO_4$ | 0.02 | 1.83 |
| Example 3 | $H_3PO_4$ | 0.05 | 1.77 |
| Example 4 | $H_3PO_4$ | 0.1 | 1.67 |
| Example 5 | $H_3PO_4$ | 0.2 | 1.57 |
| Example 6 | $H_3PO_4$ | 1 | 1.33 |
| Example 7 | $H_3PO_4$ | 2 | 1.47 |
| Example 8 | $H_3PO_4$ | 5 | 1.67 |

As is clear from Table 1, it is found that as for the nonaqueous electrolyte secondary batteries of Examples 1 to 8 in which the negative electrode active material ($Li_4Ti_5O_{12}$) having a working potential of lithium not lower than 0.4 V vs. Li/Li$^+$, and the nonaqueous electrolyte containing the phosphorous compound were used, the suppression effect of the resistance increase was higher than that of Comparative Example 1 in which the nonaqueous electrolyte containing no phosphorous compound was used.

Examples 11 to 16

Nonaqueous electrolyte secondary batteries were produced in the same manner as described in Example 1 except that the compound of Table 2 below was used as the phosphorous compound contained in the nonaqueous electrolyte in place of $H_3PO_4$.

The obtained batteries of Examples 11 to 16 were subjected to the high temperature storage test in the same manner as described in Example 1. The resistance increasing rate was determined by the equation, X=R1/R2. The results are shown in Table 2 below. The results of Comparative Example 1 were also shown in Table 2 below.

TABLE 2

|  | Phosphorous compound | Content (% by mass) | Resistance increasing rate (fold) |
|---|---|---|---|
| Comparative Example 1 | — | — | 2.00 |
| Example 11 | $Na_3PO_4$ | 0.5 | 1.27 |
| Example 12 | $K_3PO_4$ | 0.5 | 1.23 |
| Example 13 | $K_2HPO_4$ | 0.5 | 1.20 |
| Example 14 | $KH_2PO_4$ | 0.5 | 1.17 |
| Example 15 | $Ca_3(PO_4)_2$ | 0.5 | 1.67 |

TABLE 2-continued

|  | Phosphorous compound | Content (% by mass) | Resistance increasing rate (fold) |
|---|---|---|---|
| Example 16 | $Mg_3(PO_4)_2$ | 0.5 | 1.33 |

As is clear from Table 2, it is found that as for the nonaqueous electrolyte secondary batteries of Examples 11 to 16 in which $A_xH_{3-x}PO_4$; (A=Na, K) and $A'_yH_{(6-2y)}(PO_4)_2$; (A'=Mg, Ca) were used as the phosphorous compound contained in the nonaqueous electrolyte, the suppression effect of the resistance increase was higher than that of Comparative Example 1 in which the nonaqueous electrolyte without containing the phosphorous compound was used. It is found that as for the nonaqueous electrolyte secondary batteries of Examples 11 to 16, the suppression effect of the resistance increase is equal to or higher than that of Example 1 in which $H_3PO_4$ was used as the phosphorous compound (described in Table 1 above).

Comparative Example 21 and Example 21

Nonaqueous electrolyte secondary batteries were produced in the same manner as described in Example 1 except that a solution prepared by adding 1M LiPF$_6$ (lithium salt) to a mixed solvent (volume ratio 1:2) of ethylene carbonate (EC) and diethyl carbonate (DEC) was used as the nonaqueous electrolyte.

Comparative Example 22 and Example 22

Nonaqueous electrolyte secondary batteries were produced in the same manner as described in Example 1 except that a solution prepared by adding 1M LiBF$_4$ (lithium salt) to a mixed solvent (volume ratio 1:2) of ethylene carbonate (EC) and diethyl carbonate (DEC) was used as the nonaqueous electrolyte.

Comparative Example 23 and Example 23

Nonaqueous electrolyte secondary batteries were produced in the same manner as described in Example 21 except that monoclinic β-type $TiO_2$ was used as the active material of the negative electrode.

Comparative Examples 24 and 25

Nonaqueous electrolyte secondary batteries were produced in the same manner as described in Example 1 except that graphite having an average particle diameter of 3.4 μm was used as the active material of the negative electrode.

The obtained batteries of Examples 21 to 23 and Comparative Examples 21 to 25 were subjected to the high temperature storage test in the same manner as described in Example 1. The resistance increasing rate was determined by the equation, X=R1/R2. The results are shown in Table 3 below.

TABLE 3

|  | Phosphorous compound | Content (% by mass) | Nonaqueous electrolyte | | Negative electrode active material | Resistance increasing rate (fold) |
|---|---|---|---|---|---|---|
|  |  |  | Lithium salt | Mixed solvent |  |  |
| Comparative Example 21 | — | — | LiPF$_6$ | EC + DEC | $Li_4Ti_5O_{12}$ | 1.73 |
| Example 21 | $H_3PO_4$ | 0.5 | LiPF$_6$ | EC + DEC | $Li_4Ti_5O_{12}$ | 1.15 |
| Comparative Example 22 | — | — | LiBF$_4$ | EC + DEC | $Li_4Ti_5O_{12}$ | 1.79 |
| Example 22 | $H_3PO_4$ | 0.5 | LiBF$_4$ | EC + DEC | $Li_4Ti_5O_{12}$ | 1.21 |

TABLE 3-continued

|  | Phosphorous compound | Content (% by mass) | Nonaqueous electrolyte Lithium salt | Mixed solvent | Negative electrode active material | Resistance increasing rate (fold) |
|---|---|---|---|---|---|---|
| Comparative Example 23 | — | — | $LiPF_6$ | EC + DEC | β-type $TiO_2$ | 2.33 |
| Example 23 | $H_3PO_4$ | 0.5 | $LiPF_6$ | EC + DEC | β-type $TiO_2$ | 1.33 |
| Comparative Example 24 | — | — | $LiPF_6$ | EC + DEC | Graphite | 3.00 |
| Comparative Example 25 | $H_3PO_4$ | 0.5 | $LiPF_6$ | EC + DEC | Graphite | 3.07 |

As is clear from Table 3, it is found that as for the nonaqueous electrolyte secondary batteries of Examples 21 to 23 in which the negative electrode active material having a working potential of lithium not lower than 0.4 V vs. Li/Li$^+$ (Li$_4$Ti$_5$O$_{12}$, monoclinic β-type TiO$_2$) and the nonaqueous electrolyte containing the phosphorous compound were used, the suppression effect of the resistance increase was higher than that of Comparative Examples 21 to 23 in which the same negative electrode active material was used and the phosphorous compound was not contained in the nonaqueous electrolyte.

As shown in Comparative Example 25, when graphite having a working potential of lithium lower than 0.4 V vs. Li/Li$^+$ as the negative electrode active material was used, even if the nonaqueous electrolyte containing the phosphorous compound was used, the suppression effect of the resistance increase could not be confirmed.

Examples 31 to 38

Nonaqueous electrolyte secondary batteries were produced in the same manner as described in Example 1 except that the phosphorous compound shown in Table 4 was contained in the negative electrode in the amount shown in Table 4.

Examples 39 and 40

Nonaqueous electrolyte secondary batteries were produced in the same manner as described in Example 1 except that the phosphorous compound shown in Table 4 was contained in the negative electrode in the amount shown in Table 4, monoclinic β-type TiO$_2$ was used as the negative electrode active material, and a solution prepared by dissolving 1M LiPF$_6$ in a mixed solvent (volume ratio 1:2) of ethylene carbonate (EC) and diethyl carbonate (DEC) was used as the nonaqueous electrolyte.

The obtained batteries of Examples 31 to 40 were subjected to the high temperature storage test in the same manner as described in Example 1. The resistance increasing rate was determined by the equation, X=R1/R2. The results are shown in Table 4 below. The results of Comparative Example 1 were also shown in Table 4 below.

TABLE 4

|  | Phosphorous compound | Content (% by mass) | Nonaqueous electrolyte Lithium salt | Mixed solvent | Negative electrode active material | Resistance increasing rate (fold) |
|---|---|---|---|---|---|---|
| Comparative Example 1 | — | — | $LiBF_4$ | EC + GBL | $Li_4Ti_5O_{12}$ | 2.00 |
| Example 31 | $Na_3PO_4$ | 0.5 | $LiBF_4$ | EC + GBL | $Li_4Ti_5O_{12}$ | 1.67 |
| Example 32 | $Na_3PO_4$ | 1 | $LiBF_4$ | EC + GBL | $Li_4Ti_5O_{12}$ | 1.60 |
| Example 33 | $Na_3PO_4$ | 3 | $LiBF_4$ | EC + GBL | $Li_4Ti_5O_{12}$ | 1.53 |
| Example 34 | $Na_3PO_4$ | 5 | $LiBF_4$ | EC + GBL | $Li_4Ti_5O_{12}$ | 1.57 |
| Example 35 | $K_3PO_4$ | 0.5 | $LiBF_4$ | EC + GBL | $Li_4Ti_5O_{12}$ | 1.60 |
| Example 36 | $K_3PO_4$ | 1 | $LiBF_4$ | EC + GBL | $Li_4Ti_5O_{12}$ | 1.50 |
| Example 37 | $K_3PO_4$ | 3 | $LiBF_4$ | EC + GBL | $Li_4Ti_5O_{12}$ | 1.50 |
| Example 38 | $K_3PO_4$ | 5 | $LiBF_4$ | EC + GBL | $Li_4Ti_5O_{12}$ | 1.57 |
| Example 39 | $K_3PO_4$ | 1 | $LiPF_6$ | EC + DEC | β-type $TiO_2$ | 1.50 |
| Example 40 | $K_3PO_4$ | 3 | $LiPF_6$ | EC + DEC | β-type $TiO_2$ | 1.43 |

As is clear from Table 4, it is found that as for the nonaqueous electrolyte secondary batteries of Examples 31 to 40 in which the negative electrode containing the phosphorous compound and the negative electrode active material having a working potential of lithium not lower than 0.4 V vs. Li/Li$^+$ (Li$_4$Ti$_5$O$_{12}$, monoclinic β-type TiO$_2$), and the nonaqueous electrolyte containing fluorine-containing lithium salt were used, the suppression effect of the resistance increase was higher than that of Comparative Example 1 in which the negative electrode without containing the phosphorous compound was used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A nonaqueous electrolyte battery comprising:
   a case;
   a positive electrode comprising an active material and provided in the case;

a negative electrode which is provided in the case and comprises an active material having a lithium absorption potential of not lower than 0.4 V vs. Li/Li$^+$; and a nonaqueous electrolyte which is provided in the case and comprises a fluorine-containing lithium salt and a phosphorous compound, wherein the phosphorous compound is at least one selected from the group consisting of $A_xH_{3-x}PO_4$, wherein A is K, and x is greater than 0 and at most 3, and $A'_yH_{(6-2y)}(PO_4)_2$, wherein A' is at least one element selected from the group consisting of Mg and Ca, and y is greater than 0 and at most 3.

2. The battery according to claim 1, wherein the negative electrode is spatially apart from the positive electrode.

3. The battery according to claim 1, wherein a content of the phosphorous compound falls within a range of 0.01 to 5% by mass based on a mass of the nonaqueous electrolyte.

4. The battery according to claim 1, wherein the fluorine-containing lithium salt is at least one lithium salt selected from the group consisting of lithium hexafluorophosphate, lithium tetrafluoroborate, lithium hexafluoroarsenate, lithium trifluoromethasulfonate, and bistrifluoromethylsulfonylimide lithium.

5. The battery according to claim 1 wherein the active material of the negative electrode is a lithium titanium composite oxide having a specific surface area of 5 to 50 m$^2$/g as determined by a BET method using N$_2$ adsorption.

6. The battery according to claim 1, further comprising:
a separator which is provided between the positive electrode and the negative electrode, and which comprises cellulose.

7. The battery according to claim 1, wherein the active material of the positive electrode is a lithium transition metal composite oxide comprising Mn or Fe.

8. A battery pack comprising at least one kind of member selected from the group consisting of:

a plurality of the nonaqueous electrolyte batteries according to claim 1 which are electrically connected in series, and a plurality of the nonaqueous electrolyte batteries according to claim 1 which are electrically connected in parallel.

9. The battery according to claim 1, wherein the active material of the negative electrode comprises at least one selected from the group consisting of a lithium titanium composite oxide, a lithium niobium composite oxide, a lithium molybdenum composite oxide, a lithium iron composite sulfide and a titanium composite oxide.

10. The battery according to claim 1, wherein the active material of the negative electrode has an average primary particle diameter of 1 μm or less.

11. The battery according to claim 1, wherein the active material of the positive electrode comprises at least one selected from the group consisting of manganese dioxide capable of absorbing lithium, iron oxide capable of absorbing lithium, copper oxide capable of absorbing lithium, nickel oxide capable of absorbing lithium, a lithium manganese composite oxide, a lithium nickel composite oxide, a lithium cobalt composite oxide, a lithium nickel cobalt composite oxide, a lithium manganese cobalt composite oxide, a spinel-type lithium manganese nickel composite oxide, a lithium phosphorus oxide having an olivine structure, iron sulfate, a vanadium oxide and a lithium nickel cobalt manganese composite oxide.

12. The battery according to claim 1, wherein the phosphorous compound is $A_xH_{3-x}PO_4$, wherein A is K, and x is greater than 0 and at most 3.

13. The battery according to claim 12, wherein A is K.

14. The battery according to claim 1, wherein the phosphorous compound is $A'_yH_{(6-2y)}(PO_4)_2$, wherein A' is at least one element selected from the group consisting of Mg and Ca, and y is greater than 0 and at most 3.

15. The battery according to claim 14, wherein A' is Mg.

16. The battery according to claim 14, wherein A' is Ca.

* * * * *